United States Patent [19]
Suzuki et al.

[11] Patent Number: 5,376,448
[45] Date of Patent: Dec. 27, 1994

[54] RUBBER COVERED ROLL AND RUBBER COMPOSITION FOR RUBBER COVERED ROLL

[75] Inventors: Shigeru Suzuki, Kaisei; Motofumi Oyama, Yokosuka, both of Japan

[73] Assignee: Nippon Zeon Co., Ltd., Tokyo, Japan

[21] Appl. No.: 54,668

[22] Filed: Apr. 30, 1993

Related U.S. Application Data

[63] Continuation of Ser. No. 617,834, Nov. 26, 1990, abandoned.

[30] Foreign Application Priority Data

Dec. 8, 1989 [JP] Japan ............... 1-319242
Nov. 19, 1990 [JP] Japan ............... 2-311649

[51] Int. Cl.$^5$ .................. B32B 25/00; B21B 31/08
[52] U.S. Cl. .................. 428/382; 428/372; 428/375; 428/377; 428/383; 428/389; 428/390; 428/461; 428/462; 492/56
[58] Field of Search ........... 428/379, 375, 383, 389, 428/372, 382, 380, 390; 525/274; 29/110, 132; 492/48, 56

[56] References Cited

U.S. PATENT DOCUMENTS

| | | | |
|---|---|---|---|
| 2,594,348 | 4/1952 | Rockoff | 29/132 |
| 4,713,409 | 12/1987 | Hayes et al. | 525/274 |
| 4,720,526 | 1/1988 | Roland | 525/274 |
| 4,843,114 | 6/1989 | Touchet et al. | 524/87 |
| 4,918,144 | 4/1990 | Fukuda | 525/263 |
| 4,981,381 | 1/1991 | Murata | 29/132 |
| 4,990,570 | 2/1991 | Saito et al. | 525/254 |

FOREIGN PATENT DOCUMENTS

| | | | |
|---|---|---|---|
| 53-085842 | 10/1986 | Japan. | |
| 3101446 | 5/1988 | Japan | 29/132 |
| 710765 | 6/1954 | United Kingdom | 29/132 |
| 2042553 | 9/1980 | United Kingdom. | |
| 2104529 | 3/1983 | United Kingdom | 525/274 |

*Primary Examiner*—Patrick J. Ryan
*Assistant Examiner*—J. M. Gray
*Attorney, Agent, or Firm*—Lowe, Price, LeBlanc & Becker

[57] ABSTRACT

Disclosed herein is a rubber covered roll comprising a metallic core and at least one covering rubber layer. The covering rubber layer is a vulcanized rubber layer formed by a rubber composition comprising an ethylenically unsaturated nitrile-conjugated diene type highly saturated copolymer rubber (A) having a conjugated diene unit content of the polymer chain of at most 25 wt. % and the zinc salt (B) of an ethylenically unsaturated carboxylic acid. A covering rubber layer coming into contact with the metallic core is at least a vulcanized rubber layer formed by a rubber composition comprising 100 parts by weight of a rubber component containing at least 50 wt. % of the highly saturated copolymer rubber (A) and 10–40 parts by weight of the zinc salt (B). A rubber composition for rubber covered rolls is also disclosed. It comprises 100 parts by weight of a rubber component containing 90–50 wt. % of the highly saturated copolymer rubber (A) and 50–10 wt. % of a diene rubber, and 10–40 parts by weight of the zinc salt (B) of an ethylenically unsaturated carboxylic acid.

9 Claims, 1 Drawing Sheet

RUBBER COVERED ROLL AND RUBBER COMPOSITION FOR RUBBER COVERED ROLL

This application is a continuation of U.S. Ser. No. 07/617,834, filed Nov. 26, 1990, now abandoned.

FIELD OF THE INVENTION

This invention relates to a rubber covered roll obtained by covering a metallic core with rubber, and more specifically, to both rubber covered roll and rubber composition for the rubber covered roll, which are excellent in strength properties, abrasion resistance and heat resistance and moreover superb in heat build-up and adhesion to an iron core.

BACKGROUND OF THE INVENTION

Rubber covered rolls are obtained by covering a metallic core such as an iron core with a compounded rubber and then vulcanizing and forming the compounded rubber, and are widely used in industrial machines in fields of iron manufacture, paper making, pulp, spinning, printing, plywood, etc. The performance of these rubber covered rolls varies depending upon machines in which they are used, applications intended, conditions for use and others, and rubber materials are selected according to desired conditions.

In general, chloroprene rubber (CR), acrylonitrile-butadiene copolymer rubber (NBR), styrene-butadiene copolymer rubber (SBR) and the like have conventionally been used widely as covering rubber materials for rubber covered rolls.

In recent years, speeding up of machines has however been attempted in various industrial fields such as iron manufacture, paper making and printing with a view toward improving productivity. With such speeding up, the conditions for use of the rubber covered rolls have also been changed to high temperature, high load and high-speed revolution. For this reason, covering rubber materials for rubber covered rolls have come to require good heat aging resistance, good mechanical strength properties and small heat build-up to repeated compression at a much higher level.

Further, in order to improve productivity, rubber covered rolls having a longer life have been required so as not to stop any production lines. For this reason, there has been a demand for developing a rubber material having good abrasion resistance and high tensile strength.

However, rubber materials having been used for covering materials to date encounter difficulties in producing any rubber covered rolls having good heat resistance, small heat build-up and long life. There have not been obtained under the circumstances any rubber covered rolls which can meet satisfactorily the recent demand level.

There are nitrile-containing highly saturated rubbers typified by hydrogenated NBR as heat-resistant and oil-resistant rubber materials. Although the hydrogenated NBR is relatively good in heat build-up and has abrasion resistance and tear strength improved more than those in NBR, it is still insufficient. Sufficient performance cannot hence be expected therefrom to use as a covering rubber for rolls.

In more recent years, it has been proposed to obtain a vulcanizate having excellent strength properties by blending a metal salt of an ethylenically unsaturated carboxylic acid with hydrogenated NBR (EP 344350). Such a vulcanizate is however insufficient in heat build-up. In addition, when the proportion of the metal salt is made higher to enhance the abrasion resistance and tear strength of a resulting vulcanizate, its adhesion to a metallic core is lowered even when an adhesive is used.

OBJECTS AND SUMMARY OF THE INVENTION

It is an object of this invention to provide a rubber covered roll excellent in strength properties, abrasion resistance and heat resistance and also superb in build-up and adhesion to an iron core.

The present inventors have carried out an extensive investigation with a view toward overcoming the above-mentioned problems involved in the prior art. As a result, it has been found that when in a rubber covered roll comprising a metallic core and one or more covering rubber layers, a rubber composition comprising an ethylenically unsaturated nitrile-conjugated diene type highly saturated copolymer rubber (A) having a conjugated diene unit content of the polymer chain of at most 25 wt. % and the zinc salt (B) of an ethylenically unsaturated carboxylic acid is used in the covering rubber layers and moreover, a rubber composition comprising 100 parts by weight of a rubber component containing at least 50 wt. % of the highly saturated copolymer rubber (A) and 10–40 parts by weight of the zinc salt (B) is used at least as a rubber material for the covering rubber layer coming into contact with the metallic core and the composition is vulcanized with an organic peroxide and/or the like, a rubber covered roll excellent in adhesion to the metallic core can be obtained.

It has also been found that when a diene rubber is blended in a specific proportion with the rubber component, the heat build-up of the rubber covered roll is further improved.

It has further been found that when the covering rubber layer is formed, for example, by two layers of an inner layer coming into contact with the metallic core and an outer layer forming a surface layer, and a rubber composition comprising a blended rubber of the highly saturated copolymer rubber (A) and a diene rubber and the zinc salt (B) in a specific proportion is used in the inner layer, there can be obtained a rubber covered roll in which the heat build-up is improved, the adhesion to the iron core is also good, and moreover the abrasion resistance and strength are excellent owing to the good interlayer adhesion of the inner layer even when a highly saturated copolymer rubber composition containing the zinc salt (B) of the ethylenically unsaturated carboxylic acid in a relatively great amount is used in the outer layer.

The present invention has been led to completion on the basis of these findings.

According to this invention, there is thus provided a rubber covered roll comprising a metallic core and at least one covering rubber layer, characterized in that the covering rubber layer is a vulcanized rubber layer formed by a rubber composition comprising an ethylenically unsaturated nitrile-conjugated diene type highly saturated copolymer rubber (A) having a conjugated diene unit content of the polymer chain of at most 25 wt. % and the zinc salt (B) of an ethylenically unsaturated carboxylic acid, and a covering rubber layer coming into contact with the metallic core is at least a vulcanized rubber layer formed by a rubber composition comprising 100 parts by weight of a rubber component containing at least 50 wt. % of the highly saturated copolymer rubber (A) and 10–40 parts by weight of the zinc salt (B).

According to this invention, there is also provided a rubber composition for rubber covered rolls, which comprises 100 parts by weight of a rubber component containing 90–50 wt. % of an ethylenically unsaturated nitrile-conjugated diene type highly saturated copolymer rubber (A) having a conjugated diene unit content of the polymer chain of at most 25 wt. % and 50–10 wt. % of a diene rubber, and 10–40 parts by weight of the zinc salt (B) of an ethylenically unsaturated carboxylic acid.

DETAILED DESCRIPTION OF THE INVENTION

Figure 1:
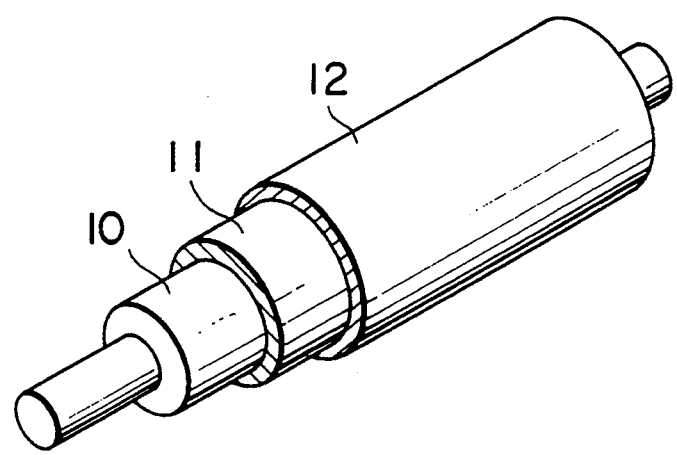
FIG. 1 is a perspective view, partly in section, illustrating the structure of a rubber covered roll according to one embodiment of this invention.

Features of the present invention will hereinafter be described in detail.

(Metallic core)

The rubber covered roll according to this invention uses a metallic core as a core material. No particular limitation is imposed on the metal used so long as it is that having been used as a core material for general rubber covered rolls. As exemplary metallic cores, may be mentioned iron cores (cast iron, steels for piping, stainless steel and the like), an aluminum core, etc.

(Rubber component)

The ethylenically unsaturated nitrile-conjugated diene type highly saturated copolymer rubber (A) useful in the practice of this invention includes a rubber obtained by hydrogenating the conjugated diene units of a copolymer rubber derived from an ethylenically unsaturated nitrile monomer such as acrylonitrile, methacrylonitrile or α-chloroacrylonitrile and a conjugated diene monomer such as 1,3-butadiene, isoprene, 1,3-pentadiene or 2,3-dimethyl-1,3-butadiene; a copolymer rubber derived from the above-mentioned two types of monomers and at least one monomer copolymerizable therewith, for example, an ethylenically unsaturated carboxylic acid ester such as methyl (meth)acrylate, ethyl (meth)acrylate, propyl (meth)acrylate, butyl (meth)acrylate, methoxyethyl (meth)acrylate or ethoxyethyl (meth)acrylate, or a cyano-substituted alkyl ester of (meth)acrylic acid such as cyanomethyl (meth)acrylate, 1- or 2-cyanoethyl (meth)acrylate, 1-cyanopropyl (meth)acrylate, 4-cyanobutyl (meth)acrylate, 6-cyanohexyl (meth)acrylate, 2-ethyl-6-cyanohexyl (meth)acrylate or 8-cyanooctyl (meth)acrylate; and a rubber obtained by hydrogenating the conjugated diene units of this copolymer rubber.

The content of the ethylenically unsaturated nitrile monomer is 10–60 wt. %, preferably 20–50 wt. %. If the content is less than 10 wt. %, the resulting rubber does not have sufficient oil resistance. If the content exceeds 60 wt. %, the resulting rubber has reduced elasticity. It is hence not preferable to use such a nitrile monomer in any amounts outside the specified range.

The content of the conjugated diene units in the copolymer rubber is at most 25 wt. %, preferably at most 20 wt. %. If the content exceeds 25 wt. %, no appreciable improvement in strength properties can be achieved.

In this invention, the ethylenically unsaturated nitrile-conjugated diene type highly saturated copolymer rubber (A) can be used singly. However, when using a blended rubber obtained by blending at least one of diene rubbers such as NBR, SBR, CR and natural rubber (NR) with the copolymer rubber, the heat generation of the resulting rubber covered roll can be lowered and the raw material cost can be reduced.

The amount of the diene rubber blended is generally at most 50 wt. %, preferably 10–50 wt. %, more preferably 15–40 wt. %, particularly preferably 20–35 wt. %, of the rubber component. Any proportions of the diene rubber too low produce little effect to improve heat build-up. On the contrary, any proportions too high bring about the deterioration of physical properties such as mechanical strength. It is hence not preferable to blend the diene rubber in both too low and too high proportions.

(Zinc salt of ethylenically unsaturated carboxylic acid)

The zinc salt of the ethylenically unsaturated carboxylic acid useful in the practice of this invention includes, for example, the zinc salts of unsaturated monocarboxylic acids such as (meth)acrylic acid, crotonic acid and 3-butenic acid; unsaturated dicarboxylic acids such as maleic acid, fumaric acid and itaconic acid; monoesters of unsaturated dicarboxylic acids such as monomethyl maleate, monoethyl maleate and monoethyl itaconate; unsaturated polycarboxylic acids other than the above; and esters of unsaturated polycarboxylic acids, in which at least one free carboxylic group remains intact.

These zinc salts may be formed in situ by mixing their corresponding ethylenically unsaturated carboxylic acids with the oxide, hydroxide or carbonate of zinc and reacting them into the zinc salts, at a stage preparing the rubber composition.

The proportion of the zinc salt of the ethylenically unsaturated carboxylic acid blended per 100 parts by weight of the rubber component is 10–40 parts by weight, preferably 15–30 parts by weight when the rubber component comprising, as a principal component, the ethylenically unsaturated nitrile-conjugated diene type highly saturated copolymer rubber is used either as a single layer or as an inner layer coming into contact with the metallic core.

Any proportions lower than 10 parts by weight bring about the deterioration of the adhesion to the rubber of the outer layer when the blend is used as the inner layer. Any proportions higher than 40 parts by weight deteriorates the adhesion to the iron core.

When the covering rubber layer comprises a multilayer structure of two or more layers, for example, an inner layer coming into contact with the metallic core and an outer layer forming a surface layer, it is desirable to use, as a rubber composition of the outer layer, a rubber composition obtained by blending the zinc salt (B) of the ethylenically unsaturated carboxylic acid in a proportion of 10–80 parts by weight, preferably 25–60 parts by weight, more preferably 40–60 parts by weight based on 100 parts by weight of the ethylenically unsaturated nitrile-conjugated diene type highly saturated copolymer rubber (A). Besides, it is preferred that the content of the zinc salt (B) in the outer layer should be relatively greater than that in the inner layer. In such a way, it is possible to form a surface layer excellent in abrasion resistance and strength properties.

(Vulcanization)

The rubber composition according to this invention is vulcanized with an organic peroxide and/or a sulfur vulcanizing system. Among these, it is preferable to vulcanize the rubber composition with a vulcanizing agent comprising, as a principal component, an organic peroxide. By using the organic peroxide, the vulcanization proceeds sufficiently, thereby being able to obtain a vulcanizate excellent in physical properties.

The organic peroxide used in this invention may be any of those which are used in peroxide vulcanization of ordinary rubbers. As examples thereof, may be mentioned dicumyl peroxide, di-t-butyl peroxide, t-butylcumyl peroxide, benzoyl peroxide, 2,5-dimethyl-2,5-di(t-butylperoxy)hexane-3, 2,5-dimethyl-2,5-di(benzoylperoxy)-hexane and 2,5-dimethyl-2,5-mono(t-butylperoxy)hexane. These organic peroxides may be used either singly or in combination of two or more, and are generally used in a range of 0.2–10 parts by weight per 100 parts by weight of the rubber component.

The vulcanization can be effected using sulfur and various vulcanizing accelerators. These sulfur vulcanizing systems may be used in combination with the organic peroxide.

(Other components)

In this invention, a variety of compounding additives may optionally be blended in the rubber composition.

When a polyfunctional monomer such as triallyl isocyanurate or trimethylolpropane triacrylate is blended with the rubber component, the rubber component can be made low heat build-up and the performance of the resulting rubber covered roll is further improved. When the covering rubber layer has a multi-layer structure, the polyfunctional monomer may be added to either of the inner and outer layers. In particular, it is preferable to incorporate it in the rubber composition for the inner layer. The proportion to be blended is generally at most 15 parts by weight, preferably 1–15 parts by weight, more preferably 5–15 parts by weight, per 100 parts by weight of the rubber component.

The rubber covered roll according to this invention is excellent in abrasion resistance and chipping resistance. However, when abrasion resistance, chipping resistance and cutting resistance are required for the roll at a particularly high level, short fibers of 1–30 mm long may be mixed in the surface rubber layer. Although no particular limitation is imposed on the short fibers used, nylon fibers, aromatic polyamide fibers, glass fibers and the like are preferred. In this case, at least one of these short fibers is used in a proportion of generally 1–10 parts by weight, preferably 1–5 parts by weight, per 100 parts by weight of the rubber component of the outer layer. Any proportions of the short fibers too high deteriorate the processability of the resulting mixture and the dispersibility of the short fibers.

Various additives normally used in the rubber compounding may be suitably incorporated in the rubber component depending upon the purposes for which the resulting composition is used. Such additives include, for example, reinforcing agents such as carbon black and silica, fillers such as calcium carbonate and talc, plasticizers, stabilizers, processing aids and coloring agents.

(Rubber covered roll)

With respect to the rubber covered roll according to this invention, the metallic core is generally covered with the rubber layer through an adhesive.

No particular limitation is imposed on the adhesive so long as it satisfactorily adheres to both metal and rubber. For example, a phenolic adhesive is preferably used.

The covering rubber layer is composed of one layer or has a multi-layer structure of two or more layers. As specific examples, may be mentioned the following layer structures. However, the ethylenically unsaturated nitrile-conjugated diene type highly saturated copolymer rubber and the zinc salt of the ethylenically unsaturated carboxylic acid are abbreviated as a "highly saturated copolymer rubber (A)" and a "zinc salt (B)", respectively.

(1) A covering rubber layer composed of a single rubber layer which has been obtained by vulcanizing a rubber composition comprising 100 parts by weight of a rubber component, which comprises, as a principal component, a highly saturated copolymer rubber (A), and 10–40 parts by weight of a zinc salt (B), with an organic peroxide and/or the like.

(2) A covering rubber layer composed of a single vulcanized rubber layer formed by a rubber composition in which the above-described rubber component comprises 50–90 wt. % of the highly saturated copolymer rubber (A) and 50–10 wt. % of the diene rubber.

(3) A covering rubber layer of a two-layer structure in which a vulcanized rubber layer formed by a rubber composition comprising 100 parts by weight of the highly saturated copolymer rubber (A) and 10–40 parts by weight of the zinc salt (B) has been used as an inner layer coming into contact with a metallic core, and another vulcanized rubber layer formed by a rubber composition comprising 100 parts by weight of the highly saturated copolymer rubber (A) and 25–60 parts by weight of the zinc salt (B) has been used as an outer layer. It is however preferred that the content of the zinc salt (B) in the outer layer should be greater than that in the inner layer.

(4) A covering rubber layer of a two-layer structure in which a vulcanized rubber layer formed by a rubber composition comprising 100 parts by weight of a rubber component composed of 50–90 wt. % of the highly saturated copolymer rubber (A) and 50–10 wt. % of a diene rubber, and 10–40 parts by weight of the zinc salt (B) has been used as an inner layer coming into contact with a metallic core, and another vulcanized rubber layer formed by a rubber composition comprising 100 parts by weight of the highly saturated copolymer rubber (A) and 10–80 parts by weight of the zinc salt (B) has been used as an outer layer.

(5) A covering rubber layer in which a vulcanized rubber layer formed by a rubber composition containing a polyfunctional monomer in a proportion of 1–15 parts by weight per 100 parts by weight of the rubber component is used as a single layer or an inner layer which comes into contact with a metallic core.

(6) A covering rubber layer in which a vulcanized rubber layer formed by a rubber composition containing reinforcing short fibers in a proportion of 1–10 parts by weight per 100 parts by weight of the rubber component is used as a surface layer (a single layer or an outer layer).

(7) A covering rubber layer having a structure in which at least one intermediate layer composed of a vulcanized rubber layer formed by a rubber composition comprising 100 parts by weight of the highly saturated copolymer rubber (A) and 10–80 parts by weight of the zinc salt (B) has been provided between the inner layer coming into contact with the metallic core and the outer layer forming a surface layer.

Incidentally, the above-described layer structures as to the covering rubber layers have been mentioned by way of example, and this invention is not limited thereto.

In order to produce, for example, a rubber covered roll having a covering rubber layer of a two-layer structure comprising an inner layer and an outer layer, among the rubber covered rolls of this invention, it is only necessary, as illustrated in FIG. 1, to subject the surface of an iron core 10 to a blasting treatment; apply an adhesive to the surface; (1) wrap, as an inner-layer rubber 11, a compounded rubber formed of a rubber composition comprising an ethylenically unsaturated nitrile-conjugated diene type highly saturated copolymer rubber (A) alone or a blended rubber component of the highly saturated copolymer rubber (A) and a diene rubber, and the zinc salt (B) of an ethylenically unsaturated carboxylic acid around the iron core; (2) wrap further, as an outer-layer rubber 12, another compounded rubber composed of an ethylenically unsaturated nitrile-conjugated diene type highly saturated copolymer rubber (A) containing the zinc salt (B) of the ethylenically unsaturated carboxylic acid around the inner layer; vulcanize the compounded rubbers; and then polish the outer layer to finish it.

When making a two-layer structure composed of inner and outer layers, the thickness ratio of the inner layer to the outer layer is controlled to 10:90 through 90:10, preferably 30:70 through 70:30. If the thickness of the inner layer is too thin, an effect to make low heat build-up of the resulting roll becomes a little.

ADVANTAGES OF THE INVENTION

According to this invention, there are provided both rubber covered rolls and rubber compositions for the rubber covered rolls, which are excellent not only in strength properties, abrasion resistance and heat resistance, but also in adhesion to an iron core and between rubber layers, and are also good in heat build-up.

Since the rubber covered rolls according to this invention can sufficiently resist high temperature, high load and high-speed revolution, they do not undergo breakdown and peeling of the rubber. It is therefore possible to enhance productivity and elongate life-cycle.

EMBODIMENT OF THE INVENTION

The present invention will hereinafter be described specifically by the following Examples and Comparative Examples. Incidentally, all designations of "part" or "parts" as will be used in the Examples and Comparative Examples mean part or parts by weight unless otherwise indicated.

EXAMPLE 1

Rubber compositions as rubbers for inner layers were separately prepared in accordance with the compounding recipe shown in Table 1 by blending zinc dimethacrylate with hydrogenated NBR, and a rubber composition as a rubber for outer layers was prepared in accordance with the following compounding recipe by blending zinc dimethacrylate in a proportion of 45 parts per 100 parts of hydrogenated NBR.

After iron cores having a diameter of 75 mm were subjected to a sand-blasting treatment, they are coated with a phenolic adhesive ("TY-PLY-BN", trade name; product of Lord Corp.) as an adhesive to cover them with their corresponding rubber compositions shown in Table 1 as the inner-layer rubbers to a thickness of 4 mm. Further, the rubber composition according to the following compounding recipe as the outer-layer rubber was applied to the respective inner layers to give a thickness of 13.5 mm, thereby forming rubber covered rolls having a face of 200 mm. The thus-formed rubber covered rolls were cured by a steam vulcanization in a vulcanizer under conditions of 140° C. and 4 hours, thereby producing rubber covered rolls.

Regarding the thus-obtained rubber covered rolls, their adhesion was determined in accordance with JIS K 6301, "Testing Method of Vulcanizate".

When the proportion of zinc dimethacrylate blended was controlled to 10–40 parts per 100 parts of the hydrogenated NBR, the adhesive force of the inner-layer rubber was satisfactory for both iron core and outer-layer rubber.

| Compounding recipe of outer-layer rubber | |
|---|---|
| Zetpol 2020L (*1) | 100 parts |
| Zinc dimethacrylate | 45 parts |
| FEF carbon black | 20 parts |
| Peroxymon F40 (*2) | 5 parts |

(*1): Hydrogenated NBR produced by Nippon Zeon Co., Ltd. (acrylonitrile content: 36%, hydrogenation degree: 90%, diene content: 6.4%).
(*2): Organic peroxide catalyst produced by Nippon Oil & Fats Co., Ltd.; 1,3-bis(t-butylperoxy-isopropyl)benzene.

The results of the adhesion test are shown in Table 1.

TABLE 1

| | Comp. Example | | Invention | | | | Comp. Ex. |
|---|---|---|---|---|---|---|---|
| Inner-layer rubber No. | 1 | 2 | 3 | 4 | 5 | 6 | 7 |
| Compounding recipe | | | | | | | |
| Hydrogenated NBR (Zetpol 2020L) | 100 | 100 | 100 | 100 | 100 | 100 | 100 |
| Zinc dimethacrylate | — | 5 | 10 | 20 | 30 | 40 | 50 |
| FEF carbon black | 40 | 40 | 40 | 40 | 40 | 40 | 40 |
| Organic peroxide (Peroxymon F40) | 5 | 5 | 5 | 5 | 5 | 5 | 5 |
| Adhksion to outer-layer rubber (Conditions of peeling) | Inferior (*1) | Inferior (*1) | Good (*2) | Good (*2) | Good (*2) | Good (*2) | Good (*2) |
| Adhesion to iron core | Good | Good | Good | Good | Good | Good | Inferior |

TABLE 1-continued

| Inner-layer rubber No. | Comp. Example | | Invention | | | | Comp. Ex. |
|---|---|---|---|---|---|---|---|
| | 1 | 2 | 3 | 4 | 5 | 6 | 7 |
| (Conditions of peeling) | (*2) | (*2) | (*2) | (*2) | (*2) | (*2) | (*1) |

*1: Peeling between outer layer and inner layer.
*2: Breakdown of inner layer rubber.

EXAMPLE 2

Rubber covered rolls having a two-layer structure of an inner layer and an outer layer were produced in the same manner as in Example 1 except that blended rubbers composed of the hydrogenated NBR and a diene rubber and a blended rubber of the hydrogenated NBR and a poly-functional monomer, which will be shown in Table 2, were used as inner-layer rubbers in place of the hydrogenated NBR alone and rubber compositions for inner layers were prepared in accordance with the compounding recipe shown in Table 2.

In each case, since zinc dimethacrylate was contained within a range of 10–40 parts per 100 parts of the rubber component, sufficient adhesive force was obtained even when any diene rubber was added.

Besides, using the rubber composition for the outer layer, it was press-cured under vulcanization conditions of 170° C and 20 minutes to obtain a vulcanized sheet of 2 mm thick. The thus-obtained sheet was subjected to a Pico abrasion test in accordance with ASTM D-228. Its abrasion loss was found to be $3.9 \times 10^{-3}$ cc.

In addition, the heat build-up of the resulting rolls was also superior to those making use of the hydrogenated NBR alone.

The adhesion test was performed under the same conditions as in Example 1.

Furthermore, using each of the rubber covered rolls obtained, a continuous rolling test was conducted at a linear pressure of 120 kg/cm and a revolving speed of 110 rpm. All the rolls were not broken up to elapsed time of at least 20 hours, but were broken upon elapsed time of 20–30 hours. When the conditions of the rubber layers broken were observed, the inner layers were found to be cracked in all cases, but neither peeling and/or destruction of each adhesive interface between the iron core and the inner-layer rubber or between the inner-layer rubber and the outer-layer rubber, nor cracking of the outer-layer rubbers was recognized.

The results are shown in Table 2.

TABLE 2

| Inner-layer rubber compounding No. | Invention | | | | |
|---|---|---|---|---|---|
| | 8 | 9 | 10 | 11 | 12 |
| Compounding recipe | | | | | |
| Hydrogenated NBR (Zetpol 2020L) | 70 | 70 | 70 | 70 | 100 |
| NBR | 30 | — | — | — | — |
| SBR | — | 30 | — | — | — |
| CR | — | — | 30 | — | — |
| NR | — | — | — | 30 | — |
| Zinc dimethacrylate | 30 | 30 | 30 | 30 | 30 |
| FEF carbon black | 40 | 40 | 40 | 40 | 40 |
| Organic peroxide (Peroxymon F40) | 5 | 5 | 5 | 5 | 5 |
| Trimethylolpropane triacrylate | — | — | — | — | 10 |
| Adhesion to outer-layer rubber (Conditions of Peeling) | Good (*1) | Good (*1) | Good (*1) | Good (*1) | Good (*1) |
| Adhesion to iron core (Conditions of Peeling) | Good (*1) | Good (*1) | Good (*1) | Good (*1) | Good (*1) |

TABLE 2-continued

| Inner-layer rubber compounding No. | Invention | | | | |
|---|---|---|---|---|---|
| | 8 | 9 | 10 | 11 | 12 |
| Broken conditions of the rubber covered roll which has ended up in breakdown in the rolling test | Cracking of the inner-layer rubbers in all cases | | | | |
| Surface temperature of roll in the rolling test (°C.) | 59 | 61 | 60 | 62 | 65 |

*1: Breakdown of inner layer rubber.

EXAMPLE 3

Regarding the respective cases where hydrogenated NBR with zinc dimethacrylate added thereto was used as an inner-layer rubber (Compounding No. 13), this hydrogenated NBR mixture was blended with NBR to use them as an inner-layer rubber (Compounding No. 14) and the hydrogenated NBR mixture was blended with NBR and a poly-functional monomer to use them as an inner-layer rubber (Compounding No. 15), their corresponding compounded rubbers were separately prepared in accordance with the compounding recipe shown in Table 3.

Then, rubber covered rolls having a two-layer structure of an inner layer and an outer layer were produced in the same manner as in Example 1 except that these three compounded rubbers were separately used as an inner-layer rubber.

A rolling test was performed as to the resulting rubber covered rolls to confirm their rolling performance as a roll. In addition, broken conditions of layers and interfaces of the rubber covered rolls, which had ended up in breakdown (NG) as a result of the rolling test, were observed. Further, the heat build-up of the rubber covered rolls was tested. The test of the heat build-up was conducted by continuously rolling each roll for 3 hours under a linear pressure of 120 kg/cm and then measuring the surface temperature of the roll by a non-contact thermometer.

The results are shown in Table 3.

TABLE 3

| Inner-layer rubber compounding No. | Invention | | |
|---|---|---|---|
| | 13 | 14 | 15 |
| Compounding recipe | | | |
| Hydrogenated NBR (Zetpol 2020L) | 100 | 70 | 70 |
| NBR | — | 30 | 30 |
| Zinc dimethacrylate | 30 | 30 | 30 |
| FEF carbon black | 55 | 55 | 55 |
| Coumarone-indene oil | 10 | 10 | 10 |
| Organic peroxide (Peroxymon F40) | 5 | 5 | 5 |
| Trimethylolpropane triacrylate | — | — | 10 |
| Total | 200 | 200 | 210 |
| Results of the rolling test Linear pressure (kg/cm) (*1) | | | |

TABLE 3-continued

| Inner-layer rubber compounding No. | Invention | | |
|---|---|---|---|
| | 13 | 14 | 15 |
| 80 | 24 Hr OK | 24 Hr OK | 24 Hr OK |
| 100 | 24 Hr OK | 24 Hr OK | 24 Hr OK |
| 120 | 9 Hr NG | 20 Hr NG | 24 Hr OK |
| 150 | — | — | 21 Hr NG |
| Broken conditions of roll which has ended up in breakdown (NG) in the rolling test | (*2) | (*2) | (*2) |
| Surface temperature of roll in the rolling test (°C.) | 69 | 58 | 53 |

(*1) The test was conducted at a revolving speed of 110 rpm.
(*2) Breakdown of inner layer rubber.
Note:
NG means that the rubber covered roll has ended up in breakdown when continuously rolled under the conditions of the above-described rolling test.

As apparent from the results shown in Table 3, heat build-up in the case where NBR was blended was reduced in comparison with the case where the hydrogenated NBR alone was used. In the case where the polyfunctional monomer was used in combination, heat build-up was further reduced, thereby obtaining a high-performance rubber covered roll excellent in heat build-up.

EXAMPLE 4

Regarding the case where hydrogenated NBR alone was used in a compounded rubber and the cases where blended rubbers of the hydrogenated NBR and a diene rubber were separately used in compounded rubbers, their corresponding compounded rubber compositions were separately prepared in accordance with the compounding recipe shown in Table 4, and the physical properties of the vulcanizates obtained therefrom were measured. The results are shown in Table 4.

Incidentally, the values of the strength properties were determined by press-curing each of the compounded rubber compositions to obtain a vulcanized sheet of 2 mm thick and then subjecting it to the measurements according to JIS K 6301.

As apparent from Table 4, the rubber compositions according to this invention are superior in physical properties as to both tensile strength and tear strength to any single diene rubber, and hence can be used as a rubber for a single or outer layer, to say nothing of a rubber for an inner layer.

TABLE 4

| Rubber Compounding No. | Invention | | | | |
|---|---|---|---|---|---|
| | 16 | 17 | 18 | 19 | 20 |
| Compounding recipe | | | | | |
| Hydrogenated NBR (Zetpol 2020L) | 100 | 70 | 70 | 70 | 70 |
| NBR (*3) | — | 30 | — | — | — |
| SBR (*2) | — | — | 30 | — | — |
| CR (*3) | — | — | — | 30 | — |
| NR (*4) | — | — | — | — | 30 |
| Zinc dimethacrylate | 30 | 30 | 30 | 30 | 30 |
| FEF carbon black | 40 | 40 | 40 | 40 | 40 |
| Coumarone-indene oil | 10 | 10 | 10 | 10 | 10 |
| Organic peroxide (Peroxymon F40) | 5 | 5 | 5 | 5 | 5 |
| Physical properties | | | | | |
| Hardness (JIS A) | 84 | 91 | 94 | 84 | 87 |
| Tensile strength (kg/cm²) | 310 | 300 | 263 | 305 | 270 |
| Elongation (%) | 290 | 170 | 100 | 310 | 270 |
| Tear strength (kg/cm) | 74 | 54 | 46 | 63 | 66 |
| Abrasion resistance | 280 | 260 | 195 | 257 | 185 |

TABLE 4-continued

| Rubber Compounding No. | Invention | | | | |
|---|---|---|---|---|---|
| | 16 | 17 | 18 | 19 | 20 |
| ASTM D-1630 | | | | | |

(*1): "Nipol DN-200" (bound acrylonitrile: 33.5%) produced by Nippon Zeon Co., Ltd.
(*2): "Nipol 1502" (bound styrene: 23.5%) produced by Nippon Zeon Co., Ltd.
(*3): "NEOPRENE-WRT" produced by Showa Neoprene K.K.
(*4): "RSS No. 1".

EXAMPLE 5

Vulcanized sheets were obtained in the same manner as in Example 4 except that in Rubber Compounding No. 16 in Example 4, 6,6-nylon short fibers of 3 mm long and polyester short fibers of 3 mm long were separately added further as reinforcing fibers in compounding proportions shown in Table 5.

The physical properties of the thus-obtained vulcanizates are shown in Table 5.

As apparent from Table 5, the vulcanized rubber sheets with the short fibers incorporated therein were significantly enhanced in tear strength and also improved in abrasion resistance.

Therefore, the short fiber-blended rubber composition can be suitably used, in particular, as a surface layer.

TABLE 5

| Rubber Compounding No. | Invention | | | | | | |
|---|---|---|---|---|---|---|---|
| | 16 | 21 | 22 | 23 | 24 | 25 | 26 |
| Compounding recipe | | | | | | | |
| Hydrogenated NBR (Zetpol 2020L) | 100 | 100 | 100 | 100 | 100 | 100 | 100 |
| Zinc dimethacrylate | 30 | 30 | 30 | 30 | 30 | 30 | 30 |
| FEF carbon black | 40 | 40 | 40 | 40 | 40 | 40 | 40 |
| Coumarone-indene oil | 10 | 10 | 10 | 10 | 10 | 10 | 10 |
| Organic peroxide (Peroxymon F40) | 5 | 5 | 5 | 5 | 5 | 5 | 5 |
| 6,6-nylon fibers of 3 mm long | — | 1 | 3 | 5 | — | — | — |
| polyester fibers of 3 mm long | — | — | — | — | 1 | 3 | 5 |
| Physical properties | | | | | | | |
| Hardness (JIS A) | 84 | 85 | 86 | 87 | 86 | 88 | 90 |
| Tensile strength (kg/cm²) | 310 | 261 | 247 | 230 | 285 | 275 | 265 |
| Elongation (%) | 290 | 250 | 230 | 190 | 280 | 260 | 240 |
| Tear strength (kg/cm) | 74 | 87 | 95 | 98 | 95 | 96 | 94 |
| Abrasion resistance ASTM D-1630 | 280 | 290 | 350 | 330 | 290 | 300 | 290 |

We claim:

1. A rubber covered roll comprising a metallic core and at least two covering rubber layers, one of said covering rubber layers being an inner layer in contact with said metallic core and one of said covering rubber layers being an outer surface layer, characterized in that at least one of said covering rubbers layers is a vulcanized rubber layer consisting of a rubber composition comprising an ethylenically unsaturated nitrile-conjugated diene highly saturated copolymer rubber (A) having a conjugated diene unit content of the copolymer chain of at most 25 wt. % and a zinc salt (B) of an ethylenically unsaturated carboxylic acid, wherein the covering rubber layer coming into contact with the metallic core is a vulcanized rubber layer consisting of a rubber composition comprising 100 parts by weight of a rubber component composed of 50–90 wt. % of the highly unsaturated copolymer rubber (A) and 50–10 wt. % of a diene rubber and 10–40 parts by weight of the zinc salt (B), and wherein a covering rubber layer forming the outer surface layer is a vulcanized rubber layer consisting of a rubber composition comprising 100 parts by weight of a rubber component containing at least 50 wt. % of the highly saturated copolymer rubber (A) and 10–80 parts by weight of the zinc salt (B), and wherein the proportion of the zinc salt (B) contained in the rubber composition forming the outer surface layer is relatively higher than in the rubber composition forming the inner layer.

2. The rubber covered roll as claimed in claim 1, wherein the diene rubber is at least one rubber selected from the group consisting of acrylonitrile-butadiene copolymer rubber, styrene-butadiene copolymer rubber, chloroprene rubber and natural rubber.

3. The rubber covered roll as claimed in claim 1, wherein the covering rubber layers comprises an inner layer coming into contact with the metallic core and an outer surface layer, the inner layer is a vulcanized rubber layer consisting of a rubber composition comprising 100 parts by weight of the rubber component of 50–90 wt. % of the highly saturated copolymer rubber (A) and 50–10 wt. % of a diene rubber and 10–40 parts by weight of the zinc salt (B), and the outer surface layer is a vulcanized rubber layer consisting of a rubber composition comprising 100 parts by weight of the highly saturated copolymer rubber (A) and 25–60 parts by weight of the zinc salt (B).

4. The rubber covered roll as claimed in claim 1, wherein the covering rubber layer comprises an inner layer coming into contact with the metallic core and an outer surface layer, and the thickness ratio of the inner layer to the outer surface layer is 10:90 to 90:10.

5. The rubber covered roll as claimed in claim 1, wherein the rubber composition forming the inner rubber layer coming into contact with the metallic core further contains a polyfunctional monomer in a proportion of 1–15 parts by weight per 100 parts by weight of the rubber component.

6. The rubber covered roll as claimed in claim 1, wherein the rubber composition forming the outer surface layer further contains reinforcing short fibers in a proportion of 1–10 parts by weight per 100 parts by weight of the rubber component.

7. The rubber covered roll as claimed in claim 1, wherein the ethylenically unsaturated nitrile-conjugated diene highly saturated copolymer rubber (A) contains 10–60 wt. % of an ethylenically unsaturated nitrile units.

8. The rubber covered roll as claimed in claim 1, wherein the vulcanized rubber layers have been obtained by vulcanizing their corresponding rubber compositions with an organic peroxide.

9. The rubber covered roll as claimed in claim 1, wherein the rubber roll comprises an inner layer coming into contact with the metallic core and a outer surface layer, the inner layer is a vulcanized rubber layer consisting of a rubber composition comprising 100 parts by weight of the rubber component composed of 50–90 wt. % of the highly saturated copolymer rubber (A) and 50–10 wt. % of a diene rubber, and 10–40 parts by weight of the zinc salt (B), and the outer layer is a vulcanized rubber layer consisting of a rubber composition comprising 100 parts by weight of the highly saturated copolymer rubber (A) and 40–60 parts by weight of the zinc salt (B).

* * * * *